United States Patent Office 3,502,450
Patented Mar. 24, 1970

3,502,450
COMPOSITE STRUCTURE WELDED WITH TUNGSTEN-CONTAINING NICKEL-BASE FILLER METAL
Herbert E. McCoy and Domenic A. Canonico, Oak Ridge, Tenn., assignors to the United States of America as represented by the United States Atomic Energy Commission
No Drawing. Filed Aug. 8, 1967, Ser. No. 659,567
Int. Cl. B32b 15/00
U.S. Cl. 29—198                                    3 Claims

ABSTRACT OF THE DISCLOSURE

The welding of nickel base alloys is accomplished by employing weld filler metal of the base metal and modifying this filler metal so as to incorporate a sufficient quantity of tungsten which will provide a weldment containing 0.5 to 5.0 weight percent tungsten. The tungsten is added to the filler metal by alloying or by providing the filler metal with a coating of tungsten or a tungsten-containing material. Improved welding characteristics and weldment properties are realized by employing tungsten-containing filler metal.

---

The present invention relates generally to the welding of nickel base alloys with filler metal formed of the base alloy, and more particularly to an improved filler metal containing sufficient tungsten for joining nickel base alloys with weldments containing 0.5 to 5.0 weight percent tungsten. This invention was made in the course of, or under, a contract with the United States Atomic Energy Commission.

Nickel base alloys have enjoyed considerable usage as structural materials and have been found to be particularly advantageous when employed in high temperature environments such as those associated with nuclear reactors since nickel alloys exhibit good high temperature strength as well as high resistance to fluctuating stresses and shock at elevated temperatures. Nickel base alloys are also highly resistant to corrosion in a wide variety of hot gases and liquids including the highly corrosive fused fluoride salt mixtures employed in molten salt reactors.

In nuclear reactor applications of the fused fluoride salt type, the nickel base alloy found to be particularly advantageous is a nickel-molybdenum-chromium alloy because of its elevated temperature strength and resistance to corrosion by molten fluoride salts. This alloy is composed of essentially 15–22 weight percent (w/o) molybdenum, 6–8 w/o chromium, a relatively minor amount of carbon, and the balance nickel. See U.S. Patent No. 2,921,850 to Henry Inouye, et al., for a more detailed description of the composition and physical properties of this nickel base alloy. Because of the particular configurations of the containment vessel, core assembly, fuel elements, etc., this nickel alloy must necessarily be of a composition which exhibits sufficient ductility to be fabricated into the desired structural configuration. To this end it has been found that additions of certain materials to the basic Ni-Mo-Cr alloy composition had a somewhat deleterious effect upon the ductility of the alloy. For example, the addition of tungsten to the alloy had a marked effect upon the alloy in that while the tungsten increased the strength of the alloy it also introduced a brittleness factor in the alloy which rendered it excessively difficult to work with in the fabrication of the various structures. Therefore, in applications such as molten salt reactors where the successful fabrication of various structures from nickel alloy is largely due to the ductility of the alloy, the use of tungsten in the alloy composition is avoided to the extent that the alloy is virtually, if not completely, tungsten-free.

While the formation of various structural components of nickel base alloy into the desired configuration has been successfully accomplished, the joining or welding of these components to form a particular structure has not heretofore been entirley satisfactory. The most frequently practiced technique of welding nickel base alloys such as described above is to draw off the base metal into wire for providing the filler metal. The weldments with this filler wire are normally accomplished by employing conventional shielded metal-arc or gas-shielded-arc welding processes. However, it was discovered that weldment provided in this manner suffered a significant shortcoming or drawback in that the weld area has significantly lower strength properties than those of the wrought base metal. For example, the rupture life of a typical weldment may be reduced by as much as a factor of 10 less than that of the wrought base metal. Also, creep-rupture specimens were found to fail with elongations of 1 to 2 percent in the weld area as compared with 10 to 15 percent elongations for the base metal.

It is the aim of the present invention to obviate or substantially minimize the above and other shortcomings by providing a novel filler metal for joining nickel base alloys with weldments exhibiting substantially better rupture lives than afforded by filler metal weldments as previously known. Further, the employment of the novel filler metal in the welding of nickel base alloys provides enhanced welding characteristics, such as, for example, improved flow of the filler metal, easier welding, better wetting of the base metal weld surfaces, etc. These and other desiderata are achieved by adding to the filler metal sufficient tungsten to provide weldments with 0.5 to 5 w/o tungsten.

An object of the present invention is to provide a new and improved weldment for nickel base alloys.

Another object of the present invention is to provide a new and improved filler metal for use in welding nickel base alloys whereby the rupture life of the joint and the welding charcteristics are significantly enhanced.

A further object of the present invention is to provide weld filler metal composed of the base metal to be welded but differing therefrom by containing a sufficient quantity of tungsten to provide weldments in base metal with 0.5 to 5.0 w/o tungsten.

Other and further objects of the invention will be obvious upon an understanding of the illustrative embodiment about to be described, or will be indicated in the appended claims, and various advantages not referred to herein will occur to one skilled in the art upon employment of the invention in practice.

As briefly pointed out above, the welding of nickel base alloys with filler metal drawn from the base metal has not heretofore been entirely satisfactory, particularly where the weldment is exposed to high temperature loadings. It was found the deficiencies in these prior weldments could be substantially minimized by employing filler metal to which tungsten has been added in a quantity sufficient to provide a weldment containing 0.5 to 5.0 w/o tungsten. The addition of this tungsten to the filler metal substantially improved the mechanical properties of the weldment, as will appear clear upon viewing the experimental data set forth in the tables below. Further, since the particular nickel alloy components being welded are normally formed into their desired shapes prior to being joined together, the presence of tungsten in the weld area does not produce any undesirable embrittlement problems with respect to the fabrication of the nickel alloy structures.

The exact mechanism by which the tungsten addition to the filler metal provides the improved weldments is not clearly understood. It may be theorized that the tungsten present in the filler metal may give some solid solution strengthening to the weld. Then again, it is also a possibility that the tungsten additives may react with the oxides present on the base metal surfaces or faying surfaces in the welding zone in such a manner as to volatilize these oxides away and thereby cleanse the metal surface to improve the wetting of the base metal.

The filler metal may be provided with the tungsten addition in any suitable manner, such as, for example, melting the filler metal and alloying tungsten therewith or by coating the filler wire with tungsten. The tungsten coating on the filler metal may be readily and economically provided by melting commercially available tungsten carbide rods in a plasma torch and then spraying the molten tungsten carbide from the torch onto the filler metal. Filler metal coated with tungsten carbide results in weldments containing some minor percentage of carbon, e.g., about 0.1 w/o when providing a weldment containing 2.0 w/o tungsten. In the event it is desired to provide welds without this carbon addition, tungsten metal may be used to form the coating and can be applied to the surface of the filler metal in any suitable manner such as by vapor deposition.

The tungsten content in the weldment has been found to be critical in that with weldments with less than approximately 0.5 w/o tungsten no beneficial results are derived, while, on the other hand, weldments with more than 5.0 w/o tungsten are excessively brittle. Accordingly, the tungsten added to the filler metal either as a coating or alloyed therewith must be closely controlled to provide weldments with tungsten in a range of 0.5 to 5.0 w/o, with about 2.0 w/o being preferred. This control of the tungsten content in the weldment may be advantageously provided for by varying the thickness of the coatings or by varying the quantity of tungsten alloyed with filler metal.

In order to provide a better appreciation for the present invention, the following tabulated data illustrate the improvements in the physical properties of weldments obtained by utilizing the novel filter wire of the invention for the welding of the Ni-Mo-Cr alloy described above. The tables include data relating to the mechanical properties of the wrought base metal and weldments (standard welds) achieved by utilizing filler metal drawn from the base metal without tungsten additions. Table I illustrates the room temperature (25° C.) tensile properties of several weldments and the wrought base metal. Table II shows the rupture life at various stress levels while at a temperature of 650° C. of the wrought base metal and of welds made by the standard filler metal welding procedure and by using the same filler metal when coated with tungsten carbide.

TABLE I.—ROOM TEMPERATURE TENSILE PROPERTIES

| Base Filler | Filler Metal | W/o of W in Weldment | Stress, p.s.i. | | Elongation, percent | | Reduction in Area, Percent |
|---|---|---|---|---|---|---|---|
| | | | Yield | Ultimate | Uniform | Total | |
| Ni-Mo-Cr Alloy | Standard (Base Metal) | 0 | 76,300 | 112,000 | 27.1 | 28.3 | 29.6 |
| | | | 81,000 | 113,100 | 22.0 | 22.3 | 37.7 |
| Do | WC Coated | 2 | 72,300 | 124,900 | 35.8 | 38.8 | 49.4 |
| Do | 5% W Alloyed | 5 | 69,200 | 88,600 | 15.0 | 16.0 | 29.8 |
| Do | (No Weldment) | | 56,000 | 120,300 | 53.4 | 56.4 | 57.5 |
| | | | 64,100 | 124,700 | 52.0 | 55.5 | 52.1 |

TABLE II.—RUPTURE LIFE IN HOURS AT 650° C.

| Base Metal | Filler Metal | W/o of W in Weldment | Stress Level, p.s.i. | | | |
|---|---|---|---|---|---|---|
| | | | 55,000 | 40,000 | 30,000 | 20,000 |
| Ni-Mo-Cr Alloy | Standard (Base Metal) | 0 | 4.6 | 18.7 | 80.9 | 1215.6 |
| Do | WC Coated | 2 | 19.1 | 89.4 | 520.9 | 3172.2 |
| Do | (No Weldment) | | 39.5 | 312.3 | 1032.5 | 5596.7 |

It will be seen that the physical properties of weldments made with the novel filler metal of the present invention exhibit significant improvements over filler metal weldments as previously known. While the above description of the present invention is directed primarily to the welding of wrought, tungsten-free Ni-Mo-Cr alloy for employment in molten salt reactors, it is to be understood that the present invention is not so limited in that it is believed the welding characteristics and the physical properties of the weldments in virtually all tungsten-free nickel base alloys will be substantially improved by utilizing the novel filler metal above described.

As various changes may be made in the composition of the filler metal, methods by which the tungsten is added to the filler metal, and the technique of welding the nickel base alloys without departing from the spirit and scope of the invention and without sacrificing any of its advantages, it is to be understood that all matter herein is to be interpreted as illustrative and not in a limiting sense.

What is claimed is:

1. A composite welded structure comprising two structural portions of wrought nickel base alloy containing virtually no tungsten joined to one another by a filler metal consisting essentially of the composition of the said nickel base alloy plus tungsten in a quantity of 0.5 to 5.0 weight percent of the filler metal.

2. The composite welded structure of claim 1, wherein the tungsten is alloyed with the filler metal.

3. The composite welded structure of claim 1, wherein said nickel base alloy consists essentially of 15–22 weight percent molybdenum, 6–8 weight percent chromium, a relatively minor amount of carbon, and the balance nickel.

References Cited

UNITED STATES PATENTS

| 1,967,872 | 7/1934 | Doan | 29—194 X |
| 2,219,462 | 10/1940 | Wissler | 117—207 X |
| 2,921,850 | 1/1960 | Inouye et al. | 75—171 |

L. DEWAYNE RUTLEDGE, Primary Examiner

E. L. WEISE, Assistant Examiner

U.S. Cl. X.R.

75—171; 117—202, 207